United States Patent [19]

Koga et al.

[11] 4,374,793

[45] Feb. 22, 1983

[54] METHOD OF PRODUCING DENSE SINTERED SILICON CARBIDE BODY FROM POLYCARBOSILANE

[75] Inventors: Kazunori Koga; Saburo Nagano; Shinichiro Mizuta; Masayoshi Nakayama, all of Kyoto, Japan

[73] Assignee: Kyoto Ceramic Kabushiki Kaisha, Japan

[21] Appl. No.: 873,150

[22] Filed: Jan. 27, 1978

[30] Foreign Application Priority Data

Jan. 27, 1977 [JP] Japan .................................. 52-8445
Feb. 16, 1977 [JP] Japan .................................. 52-16544

[51] Int. Cl.³ ............................................ C04B 35/58
[52] U.S. Cl. ........................................ 264/65; 264/66; 264/332; 501/88
[58] Field of Search .................. 264/65, 66, 63, 332; 106/44

[56] References Cited

U.S. PATENT DOCUMENTS 3,809,565  5/1974  Wewerka et al. .................. 106/44
4,080,415  3/1978  Coppola et al. ...................... 264/65

FOREIGN PATENT DOCUMENTS 2236078  3/1974  Fed. Rep. of Germany ........ 264/65

OTHER PUBLICATIONS

Yojima et al., "SiC Bodies Sintered with Three Dimensional Cross Linked Polycarbosilane", *Cir. Bull*, vol. 56, No. 12 (1977)-pp. 1060-1063.
Yojima et al., "Pyrolysis of a Polyborodiphenylsiloxane", *Nature*, No. 5602, 4-7-77, pp. 521-522.

*Primary Examiner*—John A. Parrish
*Attorney, Agent, or Firm*—Richard H. Zaitlen

[57] ABSTRACT

A method of producing a dense sintered silicon carbide body, which is high in flexural strength, purity and strength at an elevated temperature, from polycarbosilanes is disclosed. This method comprises the following steps of:

A. polymerizing organosilicon compounds to obtain insoluble and unmeltable polycarbosilane of which the melting or softening temperature lies higher than its thermal decomposition temperature;

B. grinding this insoluble and unmeltable polycarbosilane to powder;

C. decomposing this powder thermally in the range of 600° to 2200° C. in a nonoxidizing atmosphere to obtain silicon carbide;

D. molding this silicon carbide powder; and

E. sintering the thus molded body in a nonoxidizing atmosphere.

22 Claims, 1 Drawing Figure

METHOD OF PRODUCING DENSE SINTERED SILICON CARBIDE BODY FROM POLYCARBOSILANE

BACKGROUND OF THE INVENTION

1. Field of the Invention

This invention relates to a method for producing a dense sintered silicon carbide body from polycarbosilane, and more particularly, to a method of producing a dense sintered silicon carbide body having density of 2.4 to 3.2 g/cm² and flexural strength of 13 to 98 kg/mm² from polycarbosilane which is insoluble in solvents and unmeltable owing to its melting or softening temperature being higher than its thermal decomposition temperature.

This invention includes also a method capable of reducing the sintering temperature by up to 100° C. by specifying the addition time of sintering aids.

2. Prior Art

Taking the place of conventional oxide sintered ceramics which have been hitherto obtained by sintering metallic oxides such as $Al_2O_3$, $SiO_2$, MgO, $ZrO_2$, $TiO_2$ and the like, separately or in their mixed powder, a new ceramic technology capable of obtaining sintered bodies of carbide such as SiC is now evolving. As for the powdered SiC, it has become possible to obtain an elaborate self-sintering body of SiC by a hot press method in which the powdered SiC is used together with a few percent of bonding agent such as alumina, boron, metallic silicon, tungsten carbide, and the like. It seems that such types of sintered bodies are high in compressive strength, and good in thermal shock resistance as well as in oxidation resistance.

In this prior art, however, the application of bonding agents leaves impurities other than SiC in the products, for example, aluminum oxide, silicon, boron, free carbon, tungsten carbide, silicon nitride, and so on, so that the thus sintered body is lower in strength at an elevated temperature and had to be laid under restriction in use.

To get over such inconveniences, a method was filed with the Japanese Patent Application No. 115965/1975, wherein powdered SiC was mixed with polycarbosilane prepared by polymerizing one or more of dimethyldichlorosilane, dodecacyclohexasilane, 1,1,3,3-tetramethyl-1,3-disilacyclobutane and so on and then fired in a nonoxidizing atmosphere to convert the polycarbosilane into SiC. This polycarbosilane employed as a binder in this method differs from that employed as a starting material in out invention only in the former's solubility and fusibility. We will refer to this method hereinafter as the invention "A". There is proposed another technique with the Japanese Patent Application No. 134122/1975 (hereinafter referred to as the invention "B"). This has for its object to increase the strength the sintered body of SiC obtained with one step according to the invention A by refiring it after having impregnated the above-mentioned bonding agents at least one time thereinto.

In another Japanese Patent Application No. 77567/1975 (hereinafter referred to as the invention "C"), there was proposed a method whereby the initial product of SiC procured by heating polycarbosilane in a nonoxidizing atmosphere was ground into a powdered body in which a high molecular compound of organosilicon as a bonding agent was mixed, and, after molding this mixture, was fired in a nonoxidizing atmosphere. Further, in another pending patent application (hereinafter referred to as the invention "D"), which the applicant of the present application had filed in the United States prior to this application, the applicants of the present application contrived a method wherein the insoluble and unmeltable polycarbosilane powder selected for a starting material is placed in a hot press mold, thereby promoting the thermal decomposition of the polycarbosilane, by controlling temperature and pressure, thus creating silicon carbide and then sintering it.

In the above-mentioned inventions from A to D, however, the following shortcomings exist

In the Inventions A to C.

In so far as a high molecular compound of organosilicon is employed here as a bonding agent, decomposition gas is generated by continued heating in the final firing process. This gas is likely to be found in the molded body, and, though extracted, it leaves traces of gas extraction behind on the outer surface of the molded body, which causes its density to deteriorate. Accordingly, it becomes impossible to achieve the desired strength. More specifically, at the time of adding a high molecular compound of organosilicon such as is soluble in solvent and meltable by heating, as seen in these inventions, the volatilization and influence of organic matter of low molecular weight emitted from the above compound prior to the final process also add to the aforesaid disadvantages. Accordingly, it is hard to obtain the desired density and strength of the product. What is worse, when silicon carbide produced from a high molecular compound or organosilicon such as are soluble in solvent and meltable by heating is fired at near 1500° C., the component parts of it begin to be volatile, so that the silicon carbide deteriorates strikingly in density and strength. Further, it is not reliable in its strength at elevated temperatures such as are required for high temperature materials.

The starting material here was polycarbosilane insoluble in solvents and unmeltable by heating. The powder of it was placed in a die wherein the "thermal decomposition—sintering" process was continuously conducted while controlling the heating and pressurizing operation. As a result, the extraction of gas was not adequately performed in the "thermal decomposition→formation of silicon carbide" process of polycarbosilane by the heating operation. Like the shortcomings in the above-mentioned inventions A to C, it was also found to be impossible to eradicate the presence of the decomposition gas within the molded body and the residual traces of gas-extracting cavities on the outer surface of the molded body, which adversely effected the density. Besides, its flexural strength remained only at 13 to 42 kg/mm², and it was difficult for it to achieve a strength higher than this.

SUMMARY OF THE INVENTION

An object of the invention is to provide a method of producing from insoluble and unmeltable polycarbosilane a dense and strong sintered silicon carbide body which is excellent in purity and strength at an elevated temperature and which has a density of 2.4 to 3.2 g/cm³ and a flexural strength of 13 to 98 kg/mm².

Another object of the invention collateral to the primary object is to reduce the sintering temperature by up to 100° C., thereby economizing in heat energy thereby lowering the production cost.

These and other objects and advantages of the present invention will be more apparent from the detailed description taken in connection with the following preferred embodiment.

According to the present invention, these and other objects are able to be achieved by a unique method which comprises the steps of: polymerizing organosilicon compounds to obtain polycarbosilane which is insoluble in solvents and unmeltable due to its melting or softening temperature being higher than its thermal decomposition temperature (hereinafter referred to as "insoluble and unmeltable polycarbosilane"); grinding the insoluble and unmeltable polycarbosilane to powder; decomposing this powder thermally in the range of 600° to 2200° C. under a nonoxidizing atmosphere so as to be able to obtain silicon carbide; grinding this silicon carbide; molding this silicon carbide powder; and sintering the resulting molded body in a nonoxidizing atmosphere. In addition, this invention contains a method by which the sintering temperature may be reduced by up to the temperature of 100° C. The method of this invention is highly serviceable as a manufacturing method of industrial materials which require strength at an elevated temperature, such as used in a combustion chamber and turbine blades for a gas turbine engine.

DETAILED DESCRIPTION OF THE INVENTION

Figure 1:
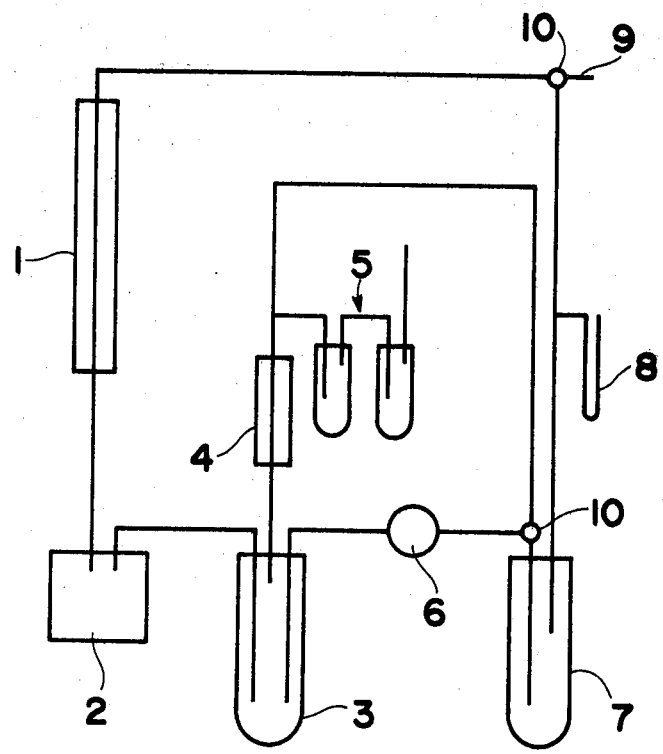
FIG. 1 is a schematic representation of a device for thermally decomposing and polymerizing organosilicon compounds to produce solid or liquid polycarbosilane soluble in solvents and meltable with heat.

The method of this invention basically comprises the following steps:

A. polymerizing organosilicon compounds to obtain insoluble and unmeltable polycarbosilane which has a melting or softening temperature higher than its thermal decomposition temperature;

B. grinding this insoluble and unmeltable polycarbosilane to powder;

C. decomposing this powder thermally at 600° to 2200° C. under a nonoxidizing atmosphere to obtain silicon carbide;

D. molding this silicon carbide powder; and

E. sintering this molded body under a nonoxidizing atmosphere.

I. The Polymerization—Step (A):

The step of obtaining insoluble and unmeltable polycarbosilane which is used in the capacity of a starting material in this invention consists in the polymerization of organosilicon compounds such as dimethyldichlorosilane, dodecamethylhexacyclosilane, 1,1,3,3-tetramethyl-1,3-disilacyclobutane and the like in compliance with the process explained below as in (A)-1 to 4. The polymerization reaction of the above-mentioned organosilicon compounds is initiated as they are or after being treated at least by any one of irradiation, heating, or adding some additive for catalytic polymerization to form polycarbosilane. By way of example, we will now take the two cases where either dimethyldichlorosilane (DMDS $(CH_3)_2 SiCl_2$) or dodecamethylhexacyclosilane are employed with advantageous usability.

(A)-1:

One kg of dimethyldichlorosilane and 400 g of metallic sodium are reacted in a solvent (such as, for example, xylene) to form white polysilane. Then the white polysilane thus formed is placed into an autoclave and heated at 490° C. under a pressure of 250 kg/cm$^2$ for about 20 hours to obtain polycarbosilane; or (A)-2:

100 g of the above polysilane is heated in a quartz tube with a condenser and is converted into a colorless and transparent liquid at about 300° C. This resulting liquid carbosilane is made to reflux for about 10 hours, while its temperature rises finally to 600° C.; 30 g of polycarbosilane being obtained; or (A)-3:

400 g of dodecamethylcyclohexasilane obtained by the reaction of dimethylchlorosilane with metallic lithium is heated in an autoclave at 490° C. for 20 hours; 230 g of polycarbosilane being obtained; or (A)-4:

Employing a device such as outlined in FIG. 1 of the accompanying drawing, 100 ml of tetramethylsilane is put in a receptacle 2 and, after the inside of the device has been replaced with nitrogen gas, tetramethylsilane is moved through a trap 3 to an evaporator 7, where tetramethylsilane is vaporized; this vapor serving as a thermal medium. Tetramethysilane is then passed in a reactor 1 filled with silica gel at 700° to 800° C. at the rate of 2 ml/min. The vapor not yet reacted is collected into the receptacle, and recirculated to further react. On the other hand, the gas of low boiling point produced by thermal decomposition is exhausted through time-delay traps 5 from within the system outwards, with the result that 18.3 g of soluble and meltable solid polycarbosilane of light yellowish brown and 20 ml of soluble liquid polycarbosilane of light yellow remain in the receptacle, both of which are heated at 490° C. for ten hours in the autoclave. Incidentally, in the FIGURE, the reference numerals 3, 4, 8, 9 and 10 denote the trap, condenser, manometer, nitrogen inlet port and valve, respectively.

In Polymerization Step (A), it is preferable that the above four processes (A)-1 to (A)-4 are employed. Every polycarbosilane obtained by any of these processes is not only insoluble in general organic solvents such as normal hexane, benzene, alcohols, dichloroethane, dichloromethane, xylene and so on, but also begins to decompose thermally at 600° C. and converts itself into silicon carbide at 1000° C., where the melting temperature cannot be observed. In this connection, the weight loss on the above thermal decomposition is 6 to 20%. Furthermore, in the above (A)-1 to (A)-4, when the heating temperature is lower than the temperature specified and the reaction time is shorter than the time specified, the polycarbosilane thus obtained is poorly polymerized and becomes as low in molecular weight as be soluble in normal hexane. Accordingly, it is not worth being the starting material according to the present invention.

II. Grinding—Step (B):

The polycarbosilane obtained in Step (A) is filled up into an alumina mortar or ball mill and ground. In grinding, it is desirable that the polcarbosilane be ground finer than 40-mesh, preferably 100-mesh, with a view to faciliting the grinding operation of silicon carbide obtained by the thermal decomposition.

III. Thermal Decomposition—Step (C):

Polycarbosilane powder obtained in the foregoing Grinding Step (B) is received in any one of crucible, sagger, or vessel, and put in an atmosphere furnace or a vacuum furnace, where it is decomposed thermally in the range from 600° C., the starting temperature of thermal decomposition, up to 2000° C., the upper limit. The temperature is controlled so as not to make the sintering process obstructed by the crystalline transition from $\beta$-SiC to $\gamma$-SiC. The preferred temperature range is from 1000° C. at which the extraction of the decomposed gas is quickly carried out and the production of the substantially amorphous silicon carbide rich in the sinterability becomes possible, to 1500° C. at which the grinding operation of the decomposed material is easily performed. The grinding operation is carried out in a nonoxidizing atmosphere, namely, either in inert or reductive gasses such as argon gas, helium gas, carbon monoxide gas, hydrogen gas, nitrogen gas, hydrocarbon gas and so on, or in vacuo. Through the thermal decomposition, polycarbosilane powder is changed into silicon carbide having already turned black.

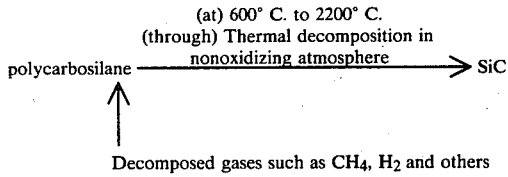

IV. Molding—Step (D):

Silicon carbide powder made in the foregoing Thermal Decomposition Step (C) as a material to be sintered is formed into a body by the usual press molding or rubber press methods, on which a machining work is executed, as occasion demands, to procure a molded body of a desired form. Incidentally, preparation of materials to be sintered to the above molded body is well done by adding such organic binders which hardly leaves behind pyrolysis gas holes and related extraction cavities as, for example, paraffin wax, aluminum stearate which remain as aluminum compounds like alumina, aluminum carbide, etc. through firing polymethyl phenylene which remains as free carbon through firing, and the like, thereby imparting the integrity of configuration to the molded body. For the purpose of procuring such a sintered body as having the desired density for a sintered body, it is to be desired that the aforesaid silicon carbide powder will be further ground by the use of a ball mill so as to be finer than 10 μm. However, in case of polycarbosilane powder already ground finely in its preparing process, it is not necessary for the silicon carbide powder to be again ground. Further, for the object of enhancing the green density of a compacted body, it is also preferable to take some measures to determine the compounding ratio of rough grain size to fine grain size therein.

Besides the press molding process and the rubber press method such as described above, the molding step according to this invention should be construed not to exclude the adoption of the hot press molding wherein silicon carbide powder is charged into a die to be molded and successively pressure sintered.

V. Sintering-Step (E):

(1) Sintering in a Nonoxidizing Atmosphere

The molded body obtained in the above Molding Step (D) is heated at the heating rate of 300° C. to 3000° C. per hour in a resistance furnace or high frequency induction heating furnace in a nonoxidizing atmosphere, i.e. in inert or reducing gases such as, for example, argon gas, helium gas, carbon monoxide gas, hydrogen gas, nitrogen gas, hydrocarbon gas and the like, or in vacuo. After having been kept intact at 1900° C. to 2200° C. for 15 to 60 minutes, it is left to cool down.

(2) Hot Pressing

By way of a hot pressing die, a graphite die is usually employed, and for its heating means, any means such as resistance heating or high frequency induction heating means will do. As a pressurizing means, oil or air pressure ram system is adopted in general on account of its controllability of pressure. When the graphite die is used for a hot pressing die, the inside of the die is able to be kept in a $N_2+CO$ gas atmosphere, so that it is not necessary to purposely introduce some nonoxidizing gas into the die from outside. However, in case of other kinds of dies, it is required to create the inert gas atmosphere of argon gas, nitrogen gas or others. As a substitute of these, the vacuum atmosphere is also applicable. The temperature of the hot pressing operation is necessary for the sintering of silicon carbide to be 1900° to 2200° C. similar to the atmosphere sintering.

This invention fundamentally comprises the above-mentioned five steps: (A), (B), (C), (D) and (E). It is also permissible to substitute Sintering Aids-Admixing Molding Step (D') for the above Molding Step (D) or a Polymerization Step (A') to obtain insoluble and unmeltable polycarbosilane containing sintering aids for the above Polymerization Step (A), respectively. IV'. Sintering Aids-Admixing Molding Step (D'):

Sintering aids are admixed with the silicon carbide powder obtained in the Thermal Decomposition Step (C), and the resultant mixture is molded in the same manner as in the previously mentioned Molding Step (D). In the capacity of the sintering aids, the respective substances or their compounds of such elements as B, Al, Fe, Ga, Ti, W, Mg, Ca, Ni, Cr, Mn, Zr, In, Sc, Be and the like are employable, and especially substances or their compounds of such elements as B, Al, Fe, W, Mg, and others (for example, $B_4C$, $ZrB_2$, $Al_2O_3$, $Fe_2O_3$, WC, MgO etc.) are preferable. These are used either separately or in appropriate combination. Amount of the sintering aids is preferably confined within the range of 0.3 to 1.0% by weight based on silicon carbide powder. When below 0.3% the density of the sintered body to be obtained is reduced and porosity of the same is increased, when over 1.0%, there is a tendency of B, Fe, Al and the like to be unevenly existent on the grain boundary of the sintered body causing a reduction of the high temperature strength. As a means for mixing the sintering aids with the silicon carbide powder, conventional dry or wet blending may be used.

I'. Polymerization-Step (A'):

For adding the sintering aids at the time when the organosilicon compound is polymerized, one can select any one of the following three processes: the process of producing polysilane from organosilicon compound, the process of producing soluble and meltable polycarbosilane from the polysilane obtained in the former process, or the process for making the same polycarbosilane insoluble and unmeltable. The sintering aids are added in such a way comes to be uniformly distributed in the liquid or gas phase during the production process of the high molecular compound of organosilicon. In this manner the sintering aids can be commingled in chemical combination or at least in the molecular level in the insoluble and unmeltable polycarbosilane to be obtained thereafter. Additioning the sintering aids performed here proves more effective as compared with the merely physical mixture such as the dry or wet process in the aforementioned Sintering Aids-Admixing Molding Step (D'), thereby being able to contribute the reduction of the sintering temperature.

The preferred sintering aids are relatively simple substances of such elements as B, Al, Fe and Ti and their halogen or organic compound out of the aforesaid aids. They are used separately or in suitable mixture and added in an amount equivalent to about 0.1 to 3.0% by weight of such element based on the insoluble and unmeltable polycarbosilane. As described above, the uniform dispersion of the sintering aids is achieved by mixing them in chemical combination or in the molecular level; the amount of additives can vary. It is to be noted that, if below 0.1%, the density of sintered body becomes insufficient, and if over 3.0%, there appears a tendency towards the reduction of high temperature strength of the sintered body being reduced.

We shall now explain this Polymerization Step (A') taking some examples in which insoluble and unmeltable polycarbosilane containing sintering aids has been obtained while using dimethyldichlorosilane and dodecamethylcyclohexasilane which are believed to be most advantageously employed among many organosilicon compounds.

(A')-1:
One kg of dimethyldichlorosilane, 10 g of titanium-iso-propoxide and 400 g of metallic sodium were caused to react with each other in xylene while letting reflux for 12 hours to obtain 410 g of polysilane containing titanium. 400 g out of this polysilane containing titanium was heated at 490° C. for 20 hours in an autoclave, to obtain 195 g of insoluble and unmeltable polycarbosilane containing in an amount equivalent to about 1% by weight of titanium as a sintering aid.

(A')-2:
One kg of dimethyldichlorosilane and 400 g of metallic sodium were caused to react with each other in xylene while letting reflux for 12 hours to obtain 423 g of polysilane. 400 g out of this polysilane was heated at 460° C. for 14 hours in an autoclave, to obtain 255 g of polycarbosilane soluble in an n-hexan. With thus-obtained polycarbosilane was mixed 40 g of aluminum-iso-propoxide. This mixture then was heated at 490° C. for 8 hours in an autoclave, to obtain 201 g of insoluble and unmeltable polycarbosilane containing in an amount equivalent to about 0.3% by weight of aluminum as a sintering aid.

(A')-3:
2.1 g of aluminum-iso-propoxide was admixed with 100 g of polysilane obtained in (A')-2. This mixture then was heated in a quartz reaction tube with condenser flowing argon gas until it was turned into colorless and transparent liquid carbosilane at 300° C. when liquid carbosilane was obtained. This liquid carbosilane was refluxed for about 10 hours, while its temperature was finally elevated to 600° C., to obtain 33 g of insoluble and unmeltable polycarbosilane containing in an amount equivalent to about 0.7% by weight of aluminum as a sintering aid.

(A')-4:
16.0 g of aluminum-iso-propoxide was admixed with 400 g of polysilane obtained in (A')-2. This mixture was heated at 490° C. for 20 hours in an autoclave to obtain 215 g of insoluble and unmeltable polycarbosilane containing in an amount equivalent to about 1.0% by weight of aluminum as a sintering aid.

(A')-5:
5.0 g of ferrous oxalate was admixed with 400 g of dodecamethylhexacyclosilane obtained through reaction of dimethyldichlorosilane with metallic lithium and was heated at 490° C. for 20 hours in an autoclave, to obtain 226 g of insoluble and unmeltable polycarbosilane containing in an amount equivalent to about 1.0% by weight of iron as a sintering aid.

(A')-6:
400 g out of polysilane obtained in (A')-2 was heated at 460° C. for 14 hours in an autoclave to obtain 278 g of polycarbosilane soluble in an organic solvent such as n-hexane. 8.0 g of methyl borate was admixed with the polycarbosilane thus obtained. The resultant mixture was heated at 490° C. for 8 hours in an autoclave to obtain 230 g of insoluble and unmeltable polycarbosilane containing in an amount equivalent to about 0.5% by weight of boron as a sintering aid.

The six processes described hitherto: (A')-1 to (A')-6 are preferably applicable.

We will now enumerate below several preferred examples according to this invention and further some comparative examples.

EXAMPLE 1

Insoluble and unmeltable polycarbosilane was prepared in the same manner as in the previously mentioned (A)-1.

After the polycarbosilane has been ground in a mortar, it passed through a 100-mesh sieve, forming a starting material. The starting material is decomposed thermally. That is, it is kept in the $CO + N_2$ gas atmosphere at 1270° C. for one hour. After cooled off, it is subjected to the grinding operation in a vibration mill furnished with iron balls. Then, with the object of removing iron which got mixed in from iron balls of the vibration mill employed, the iron was leached with hydrochloric acid and water. To the silicon carbide sintering material thus obtained was added 0.5% by weight of $B_4C$. After they had been dry-mixed, 4% by weight of paraffin wax was added. From this mixture was obtained a molded body of 12 mm × 36 mm × 5 mm by the press molding having the molding pressure of 1 t/cm². This molded body was afterwards maintained at 350° C. for one hour in vacuo. Further, it was kept in the argon atmosphere for 30 minutes after elevating the temperature therein up to 2070° C. at the rate of heating-up by 500° C. per hour with the use of a high frequency induction furnace, and then it was allowed to cool down.

The sintered body thus obtained exhibited the bulk density of 2.86 g/cm³ and the flexural strength of 21.9 kg/mm².

EXAMPLE 2

The insoluble and unmeltable polycarbosilane obtained under the foregoing (A)-3 procedure was ground and decomposed thermally in the same manner as in Example 1, to obtain silicon carbide powder. The sintering material consisting of silicon carbide obtained in this way was placed in the carbon die applied in advance with a cold releasing agent (for example, colloidal carbon) and then it was hot-pressed with the following procedure: after elevating its temperature starting from a room temperature up to 2140° C. at the heating-up rate of 2800° C. per hour under the pressure of 250 kg/cm$^2$, it was allowed to cool off.

The sintered body thus obtained displayed the bulk density of 2.72 g/cm$^3$ and the flexural strength of 24.6 kg/mm$^2$.

EXAMPLE 3

The production of polycarbosilane in this example was conducted according to the above (A)-2 procedure, but the process up to the preparation of silicon carbide powder for the sintering material was the same as in Example 1. 0.7% by weight of metallic aluminum powder was added to the sintering material consisting of silicon carbide, and both of these were dry-mixed together. The mixture thus prepared was placed in a carbon die applied in advance with a mold releasing agent (for example, colloidal carbon). Then it was hot-pressed with the following procedure: after elevating its temperature starting from a room temperature up to 1980° C. at the heating-up rate of 2800° C. per hour under the pressure of 250 kg/cm$^2$, it was allowed to cool off.

The sintered body thus obtained showed the bulk density of 3.18 g/cm$^3$ and the flexural strength of 43.5 kg/mm$^2$.

EXAMPLE 4

The production of polycarbosilane in this example was conducted according to the above (A)-2 procedure, but the process up to the preparation of silicon carbide powder for the sintering material, was the same in general as in the above-mentioned Example 1. 0.4% by weight of B$_4$C was added to the sintering material made of silicon carbide, and both of them were dry-mixed together. This mixture thus prepared was charged into graphite die applied in advance with a mold releasing agent (for example, colloidal carbon). Then it was hot-pressed with the following procedure: after elevating temperature from a room temperature up to 2040° C. at the heating rate of 2800° C. per hour under the pressure of 373 kg/cm$^2$, it was allowed to cool off.

The sintering molded body obtained in this way exhibited the bulk density of 3.12 g/cm$^2$ and the flexural strength of 55.1 kg/mm$^2$.

EXAMPLE 5

In this example, the process up to the preparation of silicon carbide powder for the sintering material is not essentially different from that of the above-mentioned Example 1, but the example here is characterized in that the polycarbosilane powder was passed through a 300-mesh screen. Now 0.4% by weight of B$_4$C was added to the silicon carbide-sintering material, and this mixture was charged into a graphite die applied in advance with a mold releasing agent (for example, colloidal carbon). It was then hot-pressed with the following procedure: after elevating temperature from a room temperature up to 2050° C. at the heating rate of 2800° C. per hour under the pressure of 275 kg/cm$^2$, it was allowed to cool off.

The sintered body obtained in this way exhibited the bulk density of 3.15 g/cm$^2$ and the flexural strength of 92.1 kg/mm$^2$.

EXAMPLE 6

In this example, polycarbosilane was produced according to (A)-1 procedure, while the process up to the preparation of the silicon carbide powder as the sintering material was the same as that in Example 1. 0.8% by weight of AlN and 0.2% by weight of B$_4$C were added to the silicon carbide-sintering material, and these three were together dry-mixed. The resultant mixture was charged into a graphite die applied in advance with a mold releasing agent (for example, colloidal carbon), and then it was hot-pressed with the following procedure: after elevating temperature from a room temperature up to 2200° C. at the heating rate of 2800° C. per hour under the pressure of 275 kg/cm$^2$, it was allowed to cool off.

The sintered body obtained in this way exhibited the bulk density of 3.07 g/cm$^3$ and the flexural strength of 63.7 kg/mm$^2$.

EXAMPLE 7

In this example, polycarbosilane was produced according to (A)-1 procedure, while the process up to the preparation of the silicon carbide powder was the same as that in Example 1. 0.8% by weight of Al$_2$O$_3$ and 0.2% by weight of B$_4$C were added to the silicon carbide-sintering material, and these three were together dry-mixed. Then 4% by weight of paraffin wax was added. This mixture was press-molded under the molding pressure of 1 t/cm$^2$ to obtain a compact molded body of 12 mm×36 mm×5 mm. Thereafter, it was dewaxed under condition of being retained at 350° C. for one hour in vacuo. Further, using a high frequency induction furnace in the argon atmosphere, and after elevating temperature up to 2100° C. at the heating rate of 500° C. per hour, it was kept for 45 minutes as it was, and after that it was allowed to cool off in argon gas. The sintered body obtained in this way exhibited the bulk density of 3.12 g/cm$^2$ and the flexural strength of 65.0 kg/mm$^2$.

EXAMPLE 8

In this example, polycarbosilane was produced according to the previously described (A)-2 procedure, while the process up to the preparation of the silicon carbide powder as the sintering material was the same as that in Example 1. 1.0% by weight of Al$_2$O$_3$ was added to the silicon carbide-sintering material, and these two were together dry-mixed. The resultant mixture was charged into the graphite die applied in advance with a mold releasing agent (for example, colloidal carbon), and then it was hot-pressed with the following procedure: after elevating temperature from a room temperature up to 2080° C. at the heating rate of 2000° C. per hour under the pressure of 275 kg/cm$^2$, it was allowed to cool off.

The sintered body obtained in this way exhibited bulk density of 3.11 g/cm$^3$ and the flexural strength of 50.0 kg/mm$^2$.

EXAMPLE 9

In this example, polycarbosilane was produced according to the previously described (A)-4 procedure, while the process up to the preparation of the silicon carbide powder as the sintering material was the same as that in Example 1. 0.5% by weight of ZrB$_2$ was added to the silicon carbide-sintering material, and these two were together dry-mixed. The resultant mixed powder was charged into a graphite die applied in advance with a mold releasing agent, and then it was hot-pressed with the following procedure: after elevating temperature for a room temperature up to 2000° C. at the heating-up rate of 2800° C. per hour under the pressure of 275 kg/cm², it was allowed to cool off.

The sintered body obtained in this way exhibited the bulk density of 2.79 g/cm³ and the flexural strength of 28.0 kg/mm².

EXAMPLE 10

In this example, polycarbosilane was produced according to the previously described (A)-1 procedure, while the process up to the preparation of the silicon carbide powder as the sintering material was the same as that in Example 1. 0.5% by weight of BN was added to the silicon carbide-sintering material, and these two were together dry-mixed. The resultant mixed powder was charged into a graphite die applied in advance with a mold releasing agent, and then it was hot-pressed with the following procedure: after elevating the temperature from a room temperature up to 2180° C. at the heating rate of 2800° C. per hour under the pressure of 275 kg/cm², it was allowed to cool off.

The sintered body obtained in this was exhibited the bulk density of 3.02 g/cm³ and the flexural strength of 40.0 kg/mm².

EXAMPLE 11

In this example, polycarbosilane was produced according to the previously described (A)-3 procedure, while the process up to the preparation of silicon carbide powder as the sintering material was the same as that in Example 1. 1.0% by weight of WC was added to the silicon carbide-sintering material, and these two were together dry-mixed. The resultant mixed powder was charged into a graphite die applied in advance with a mold releasing agent, and then it was hot-pressed with the following procedure: after elevating temperature from a room temperature up to 2200° C. at the heating rate of 2800° C. per hour under the pressure of 275 kg/cm², it was allowed to cool off.

The sintered body obtained in this way exhibited the bulk density of 2.80 g/cm³ and the flexural strength of 30.0 kg/mm².

EXAMPLE 12

In this example, polycarbosilane was produced in the same way as in the previously described (A+)-1. The polycarbosilane ground in a mortar was subjected to the 100-mesh-pass and was decomposed thermally as the starting material with the following procedure;

It was kept in the CO+N₂ gas atmosphere at 1270° C. for one hour. When cooled off, it was ground in a mill with balls for silicon carbide for 40 hours. The silicon carbide-sintering material was charged into a graphite die applied in advance with a mold releasing agent (for example, colloidal carbon, BN, etc.), and then it was hot-pressed with the following procedure: after elevating temperature from a room temperature up to 2000° C. at the heating rate of 2800° C. per hour under the pressure of 250 kg/cm², it was allowed to cool off.

The sintered body obtained in this way exhibited the bulk density of 2.74 g/cm³ and the flexural strength of 26.4 kg/mm².

EXAMPLE 13

In this example, the process up to the preparation of silicon carbide powder as the sintering material was the same as that of the foregoing Example 12, except that the production of polycarbosilane was according to the previously described (A')-2 procedure.

The silicon carbide-sintering material thus obtained was charged into a graphite die applied in advance with a mold releasing agent (for example, colloidal carbon, BN, etc.), and then it was hot-pressed with the following procedure: after elevating temperature from a room temperature up to 1800° C. at the heating rate of 2800° C. per hour under the pressure of 250 kg/cm².

The sintered body obtained in this way exhibited the bulk density of 2.87 g/cm³ and the flexural strength of 25.9 kg/mm².

EXAMPLE 14

In this example, polycarbosilane was produced according to the previously described (A')-3 procedure, while the process up to the preparation of silicon carbide powder as the sintering material was entirely the same as that of Example 12.

The mixed powder of this silicon carbide-sintering material was charged into a graphite die applied in advance with a mold releasing agent (for example, colloidal carbon, BN, etc.), and then it was hot-pressed with the following procedure: after elevating temperature from a room temperature up to 1900° C. at the heating rate of 2000° C. per hour under the 375 kg/cm², it was allowed to cool off.

The sintered body obtained in this way showed the bulk density of 3.18 g/cm³ and the flexural strength of 44.6 kg/mm².

EXAMPLE 15

In this example, polycarbosilane was produced according to the previously described (A')-4 procedure, while the process up to the preparation of silicon carbide powder as the sintering material was entirely the same as that in the precedent Example 12. 4% by weight of paraffin wax was added to the silicon carbide-sintering material, and the resultant mixture was press-molded under the molding pressure of 1 t/cm², to obtain a compacted body of 12 mm×36 mm×5 mm. It was thereafter dewaxed under condition of being kept at 350° C. for one hour in vacuo. Then using a high frequency induction furnace, the temperature was elevated to 2000° C. at the heating rate of 500° C. per hour in the argon atmosphere, where it was held for 30 minutes. After doing so, it was allowed to cool off in argon gas.

The sintered body obtained in this way exhibited the bulk density of 2.82 g/cm² and the flexural strength of 20.3 kg/mm³.

EXAMPLE 16

In this example, the process up to the preparation of silicon carbide powder as the sintering material was the same as that in the foregoing Example 12, except that the production of polycarbosilane was according to the previously described (A')-5 procedure. The silicon carbide-sintering material was charged into a graphite die applied in advance with a mold releasing agent (for example, colloidal carbon, BN, etc.), and then it was hot-pressed with the following procedure: after elevating temperature from a room temperature up to 2030°

C. at the heating rate of 2800° C. per hour under the pressure of 275 kg/cm³, it was allowed to cool off.

The sintered body obtained in this way exhibited the bulk density of 2.85 g/cm³ and the flexural strength of 21.0 kg/mm².

EXAMPLE 17

In this example, the process up to the preparation of silicon carbide powder as the sintering material was the same as that in the foregoing Example 12, except that the production of polycarbosilane was according to the previously described (A')-6 procedure. The silicon carbide-sintering material was charged into a graphite die applied in advance with a mold releasing agent (for example, colloidal carbon, BN, etc.), and then it was hot-pressed with the following procedure: after elevating temperature from a room temperature up to 1950° C. at the heating rate of 2800° C. per hour under the pressure of 275 kg/cm², it was allowed to cool off.

The sintered body obtained in this way exhibited the bulk density of 3.0 g/cm³ and the flexural strength of 41.4 kg/mm².

EXAMPLE 18

In this example, the process up to the preparation of silicon carbide powder as the sintering material was not essentially different from that in the foregoing Example 17. This example, however, was characterized in that a 300-mesh pass was carried out in the preparation process of polycarbosilane powder. The silicon carbide-sintering material was charged into a graphite die applied in advance with a mold releasing agent (for example, colloidal carbon, BN, etc.), and then it was hot-pressed with the following procedure: after elevating temperature from a room temperature up to 2000° C. at the heating rate of 2800° C. per hour under the pressure of 275 kg/cm², it was allowed to cool off.

The sintering molded body obtained in this way exhibited the bulk density of 3.14 g/cm³ and the flexural strength of 91.5 kg/mm².

EXAMPLE 19

In this example, the process up to the preparation of silicon carbide powder as the sintering material was the same as that in the foregoing Example 17, on condition that in order to remove from it the excessive free carbon it was heated at 650° C. for 50 hours in the air, and thereafter it was washed with HF and dried. The resultant silicon carbide was molded and sintered in the same manner as in Example 17.

The sintered body obtained in this way exhibited the bulk density of 3.16 g/cm³ and the flexural strength of 97.6 kg/mm².

COMPARATIVE EXAMPLE 1

(a) Starting Material: SiC powder.
(b) Binder: polycarbosilane being soluble in solvents.
(c) Molding Method: 90% by weight of SiC powder and 10% by weight of polycarbosilane of (b) which had been dissolved in normal hexane as a binder were kneaded together and molded in the form of a bar. After the solvent was removed from it under reduced pressure, the resultant product was heated from a room temperature up to 1000° C. in the nitrogen gas atmosphere, and kept for one hour as it was. Incidentally, the above polycarbosilane was obtained by putting dimethyl polysilane synthesized from dimethyldichlorosilane into an autoclave in which it was heated at 400° C. under 30 atmospheric pressure for 30 hours in the argon gas atmosphere. Its molecular weight was low, the average of which was 1500. This method is based upon the Japanese Patent Application No. 115965/1975.

COMPARATIVE EXAMPLE 2

The sintered body obtained in Comparative Example 1 was impregnated with polycarbosilane used in the same example as the binder. It was again fired at 1000° C. in the nitrogen gas atmosphere. This operation was repeated totally six times. This method is according to Japanese Patent Application No. 134122/1975.

COMPARATIVE EXAMPLE 3

(a) Starting Material: Initial product of SiC which was obtained by pyrolizing polycarbosilane at 1200° C. in the nonoxidizing atmosphere.
(b) Binder: Soluble and meltable polycarbosilane.
(c) Molding Method: The same with Comparative Example 1. This method is according to the Japanese Patent Application No. 77567/1975.

COMPARATIVE EXAMPLE 4

(a) Production of Polycarbosilane: According to the previously described (A)-1 similarly to this invention.
(b) Preparation of Polycarbosilane Powder: Out of the above polycarbosilane which had been ground in a mortar, that which went through the 100-mesh pass was charged as the starting material into a graphite die applied in advance with a mold releasing agent (for example, colloidal carbon), and then it was hot-pressed with the following procedure.
(c) Hot Press: It was heated from a room temperature up to 1000° C. under the pressure of 250 kg/cm², when it was kept for 15 minutes in this stage. Thereafter it was further heated up to 2200° C. After achieving the temperature, the pressure was cut off.

This method is according to the Japanese Patent Application No. 98292/1976.

COMPARATIVE EXAMPLE 5

(a) Production of Polycarbosilane: According to the previously described (A)-1 similarly to this invention.
(b) Preparation of Polycarbosilane Powder: The above polycarbosilane was ball-milled finer than 300-mesh, to which was added 0.4% by weight of the sintering aid B₄C, and these two were dry-mixed together. The resultant mixture was charged into a graphite die.
(c) Hot Press: Same as in Comparative Example 4 except that the heating temperature was set at 2050° C.

This method is owing to the Japanese Patent Application No. 98292/1976.

COMPARATIVE EXAMPLE 6

(a) Production of Polycarbosilane: Same as in the previously described (A')-6.
(b) Preparation of Polycarbosilane Powder: The above polycarbosilane was ball-milled, that which went through the 100-mesh pass was charged into a graphite die.
(c) Hot Press: Entirely same as in Comparative Example 4 except that the final heating temperature was set at 1950° C.

The sintered body obtained in this way gave the bulk density of 3.15 g/cm³ and the flexural strength of 44.2 kg/mm².

Being based on the hitherto described Examples 1 to 19 and Comparative Examples 1 to 6, the properties of the sintered silicon carbide bodies obtained in respective examples are tabulated as follows on the next page.

TABLE 1

| Object | | Bulk density g/cm³ | Apparent porosity vol % | Flexural strength kg/mm² | Sintering method |
|---|---|---|---|---|---|
| Example of the Invention | 1 | 2.86 | 7.2 | 21.9 | Atm. |
| | 2 | 2.72 | 10.0 | 24.6 | H. P. |
| | 3 | 3.18 | 0.1 | 43.5 | H. P. |
| | 4 | 3.12 | 0.1 | 55.1 | H. P. |
| | 5 | 3.15 | 0.0 | 92.1 | H. P. |
| | 6 | 3.07 | 0.5 | 63.7 | H. P. |
| | 7 | 3.12 | 0.02 | 65.0 | Atm. |
| | 8 | 3.11 | 0.0 | 50.0 | H. P. |
| | 9 | 2.79 | 7.5 | 28.0 | H. P. |
| | 10 | 3.02 | 0.3 | 40.0 | H. P. |
| | 11 | 2.80 | 4.0 | 30.0 | H. P. |
| | 12 | 2.74 | 10.2 | 26.4 | H. P. |
| | 13 | 2.87 | 5.3 | 25.9 | H. P. |
| | 14 | 3.18 | 0.1 | 44.6 | H. P. |
| | 15 | 2.82 | 8.0 | 20.3 | Atm. |
| | 16 | 2.85 | 6.0 | 21.0 | H. P. |
| | 17 | 3.09 | 0.2 | 41.4 | H. P. |
| | 18 | 3.14 | 0.1 | 91.5 | H. P. |
| | 19 | 3.17 | 0.0 | 97.6 | H. P. |
| Comparative Example | 1 | 2.21 | 31.0 | 2.0 | Atm. |
| | 2 | 2.63 | 10.0 | 16.0 | Atm. |
| | 3 | 2.28 | 28.1 | 2.4 | Atm. |
| | 4 | 2.43 | 28.1 | 13.0 | H. P. |
| | 5 | 3.10 | 0.2 | 42.0 | H. P. |
| | 6 | 3.15 | 0.0 | 44.2 | H. P. |

What we claimed is:

1. A method of producing a dense sintered silicon carbide body from polycarbosilane, which comprises the steps of:
    (a) polymerizing an organosilicon compound to which has been added a sintering aid so as to form a polycarbosilane containing said sintering aid, said polycarbosilane being insoluble in organic solvents and having a melting or softening temperature which is higher than its thermal decomposition temperature;
    (b) forming said polycarbosilane into powder;
    (c) thermally decomposing said powder at 600° to 2200° in a nonoxidizing atmosphere to obtain silicon carbide containing said sintering aid;
    (d) molding said silicon carbide powder; and
    (e) sintering the molded body formed in step (d) in a nonoxidizing atmosphere thereby forming a dense, sintered silicon carbide body.

2. A method as claimed in claim 1, wherein said sintering aid is selected from the group consisting of B, Al, Fe, Ti and W compounds and mixtures thereof, said sintering aid being present in an amount of 0.1 to 3.0% by weight of said polycarbosilane.

3. A method as claimed in claim 1, wherein said thermal decomposition process step (c) is conducted at 1000° to 1500° C., and the resultant silicon carbide is substantially amorphous.

4. A method as claimed in claim 1, wherein said sintering process step (e) is carried out at 1900° to 2200° C. in an atmosphere under reduced pressure.

5. A method as claimed in claim 1, wherein said sintering process step (e) is performed at 1900° to 2200° C. in a hot press.

6. A method for producing a dense, sintered silicon carbide body from polycarbosilane comprising the steps of:
    (a) polymerizing a organosilicon so as to form a polycarbosilane which is insoluble in organic solvent and has a melting or softening temperature which is higher than its thermal decomposition temperature;
    (b) forming said polycarbosilane into a powder;
    (c) thermally decomposing said powder at 600° to 2200° C. in a nonoxidizing atmosphere to obtain silicon carbide;
    (d) molding said silicon carbide powder; and
    (e) sintering the molded body formed in step (d) in a nonoxidizing atmosphere thereby forming a dense, sintered silicon carbide body.

7. A method according to claim 6 wherein said polymerization step (a) comprises heating the organosilicon for a sufficient length of time so as to produce said insoluble polycarbosilane having a melting or softening temperature which is higher than its thermal decomposition temperature.

8. A method according to claim 7 wherein said organosilicon is heated in step (a) to a temperature of at least 490° C.

9. A method according to claim 6 wherein said organosilicon is selected from the group consisting of dimethyldichlorosilane, dodecamethylhexacyclosilane, 1,1,3,3-tetramethyl-disilacyclotritane.

10. A method of producing a dense sintered silicon carbide body from polycarbosilane, which comprises the steps of:
    (a) polymerizing an organosilicon compound so as to form a polycarbosilane which is insoluble organic solvent and has a melting or softening temperature which is higher than its thermal decomposition temperature;
    (b) forming said polycarbosilane into a powder;
    (c) thermally decomposing said powder at 600° to 2200° in a nonoxidizing atmosphere to obtained silicon carbide powder;
    (d) adding a sintering aid to said silicon carbide powder;
    (e) molding said silicon carbide powder and sintering aid mixture; and
    (f) sintering the molded body formed in step (e) in a nonoxidizing atmosphere thereby forming said dense sintered silicon carbide body.

11. A method as claimed in claim 10, wherein said sintering aid is selected from the group consisting of B, Al, Fe, ti and W compounds and mixtures thereof, said sintering aid being mixed with said silicon carbide powder at the rate of 0.3 to 1.0% by weight to the weight of the silicon carbide body.

12. A method as claimed in claim 10, wherein said thermal decomposition process step (c) is conducted at 1000° to 1500° C. and the resultant silicon carbide is substantially amorphous.

13. A method as claimed in claim 10, wherein said sintering process step (f) is carried out at 1900° to 2200° in an atmosphere under reduced pressure.

14. A method as claimed in claim 10, wherein said sintering process step (f) is conducted at 1900° to 2200° C. in a hot press.

15. A method according to claim 10 wherein said polymerization step (a) comprises heating the organosilicon for a sufficient length of time so as to produce said insoluble polycarbosilane having a melting or softening temperature which is higher than its thermal decomposition temperature.

16. A method according to claim 10 wherein said organosilicon is heated in step (a) to a temperature of at least 490° C.

17. A method according to claim 1 wherein said polymerization step (a) comprises heating the organosilicon for a sufficient length of time so as to produce said insoluble polycarbosilane having a melting or softening temperature which is higher than its thermal decomposition temperature.

18. A method according to claim 2 wherein said organosilicon is heated in step (a) to a temperature of at least 490° C.

19. A method as claimed in claim 6, wherein said thermal decomposition step (c) is performed at 1000° to 1500° C. and the resultant silicon carbide is substantially amorphous.

20. A method as claimed in claim 6, wherein said sintering process step (e) is conducted in an atmosphere under reduced pressure.

21. A method as claimed in claim 6, wherein said sintering process step (e) is carried out in a hot press.

22. A method as claimed in claim 6, wherein said sintering process step (e) is performed at 1900° to 2200° C.

* * * * *